United States Patent [19]

Owen et al.

[11] 4,237,739

[45] Dec. 9, 1980

[54] INTEGRAL FLOW METERING ASSEMBLY USING A SEGMENTAL WEDGE

[75] Inventors: Raymond E. Owen, Greece; William B. Brosius, Jr., Perinton, both of N.Y.

[73] Assignee: Sybron Corporation, Rochester, N.Y.

[21] Appl. No.: 16,471

[22] Filed: Mar. 1, 1979

[51] Int. Cl.³ .............................................. G01F 1/40
[52] U.S. Cl. .................................................. 73/861.63
[58] Field of Search ................. 73/211, 212, 272 R, 73/205 R; 138/40

[56] References Cited

U.S. PATENT DOCUMENTS

| | | | |
|---|---|---|---|
| 1,706,145 | 3/1929 | Collins | 138/40 |
| 3,321,970 | 5/1967 | Walker, Sr. et al. | 73/211 |
| 3,355,946 | 5/1967 | Lazell | 73/212 |
| 3,521,487 | 7/1970 | Akeley | 73/211 |
| 3,822,592 | 7/1974 | Siegel et al. | 73/211 |
| 3,910,113 | 10/1975 | Brown | 73/212 |

FOREIGN PATENT DOCUMENTS 1071361 12/1959 Fed. Rep. of Germany .
969291 12/1950 France .

OTHER PUBLICATIONS

Gess et al., Flow Meter Engineering Handbook by Brown Instrument Co., p. 24.
Coxon et al., p. 75, Flow Measurement and Control, pub. by Heywood & Co. London, 1959.
Owen et al., "Segmental Wedge Flow Element", I.S.A. Reprint #N.F. 77-820, pp. 51–58, 1977.

*Primary Examiner*—Herbert Goldstein
*Attorney, Agent, or Firm*—Theodore B. Roessel; Joseph C. MacKenzie

[57] ABSTRACT

A flow metering assembly has a one-piece rigid body having a cylindrical bore with a segmental wedge therein, and a differential pressure transmitter, or the like, clamped thereto to receive the pressures developed on either side of the wedge in response to flow. The bore and wedge have a sliding fit with each other, the wedge is releasably fixed in place in the bore, and the assembly is inserted in a pipe line through which flows a fluid which is to be measured, such as fuel oil.

5 Claims, 3 Drawing Figures

U.S. Patent  Dec. 9, 1980  4,237,739
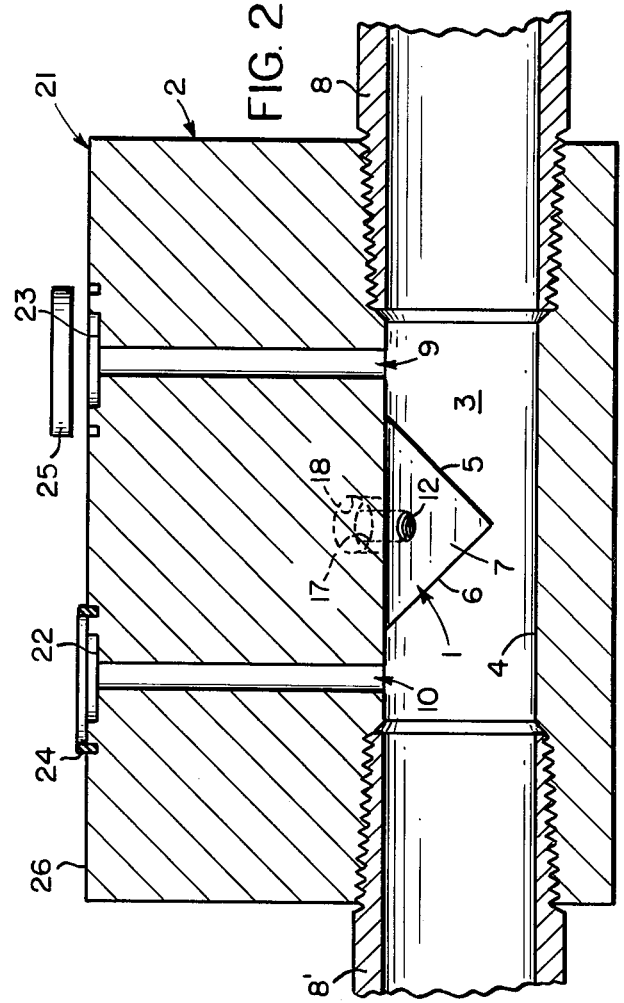
FIG. 3
FIG. 2
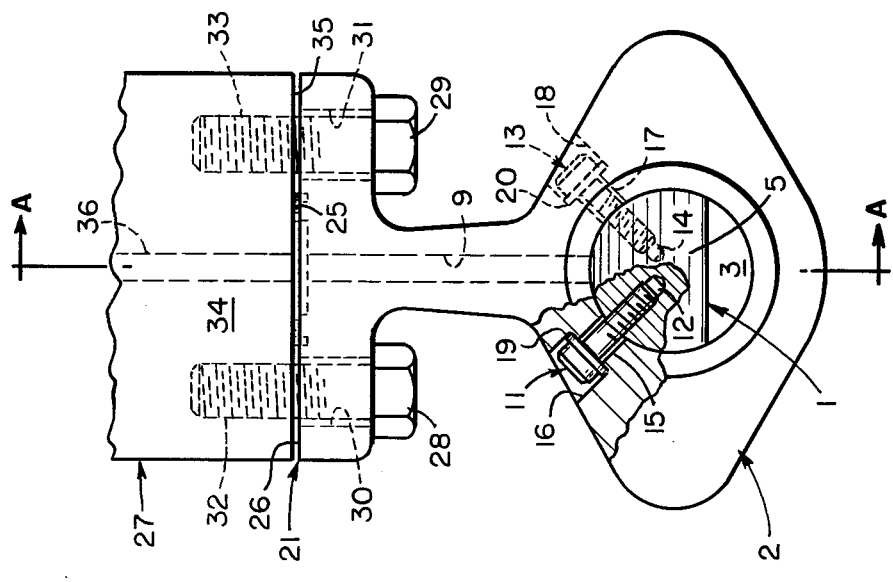
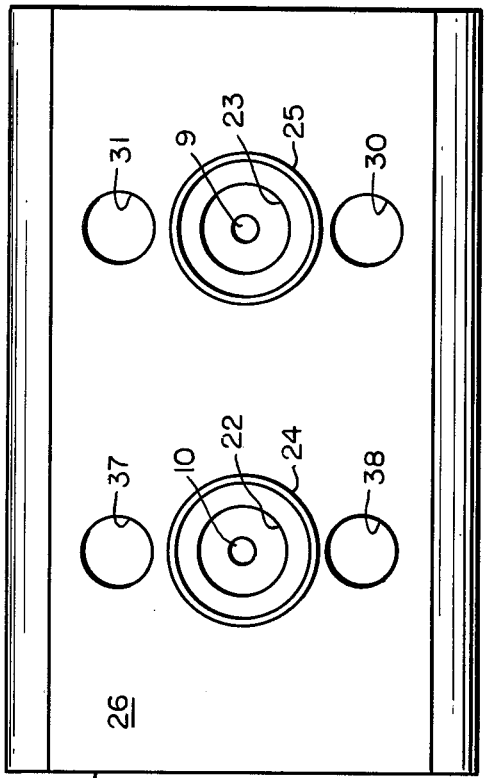
FIG. 1

INTEGRAL FLOW METERING ASSEMBLY USING A SEGMENTAL WEDGE

FIELD OF THE INVENTION

This invention relates to measuring the flow of a material through a single bore in a rigid body, wherein the bore is uniform in cross-section except at one portion which is of lesser cross-section, and so acts as a flow restriction. As is well known, such a restriction causes differing pressures to exist in the material, such that the rate flow of the material can be inferred from measurement of the pressure difference.

BACKGROUND OF PRIOR ART

The pertinent prior art form of flow restriction is the segmental wedge, and the pertinent prior art form of flow measuring assembly is one that is effectively integral with the pipe or other conductor of flow material.

The prior art of the segmental wedge is relatively compendiously set forth in ISA REPRINT N.F. 77-820, which is a paper by Raymond E. Owen, entitled SEGMENTAL WEDGE FLOW ELEMENT, and reproduced as Paper 820, pages 51–58 of *ADVANCES IN INSTRUMENTATION*, vol. 32, Part 4; Proceedings of the ISA Conference Exhibit, Niagara Falls, Oct. 17–20, 1977, Instrument Society of America, 400 Stanwix Street, Pittsburgh, Pa. 15222.

The prior art integral orifice assembly is generally a two part body having a pair of coaxial bores separated by an orifice plate and sealing gaskets sandwiched between the two body parts. The body parts are in effect inserted in a gap in a pipe line the flow through which is to be measured, with the two bores effectively forming parts of the bore of the pipe. The body parts are aligned in a jig, clamped together with the orifice plate and gaskets positioned therebetween to form the flow metering assembly, and the fluid pressure transmitter or other fluid pressure receiving means clamped to such assembly, i.e., to the clamped body parts.

With the present invention, not only do we provide the advantages of using the wedge as a flow metering restriction, and of having an integral assembly, but we also eliminate the previously mentioned orifice sealing gaskets and jig, and as well, obviate all the problems of alignment which are entitled by the prior art composite of orifice, sealing gaskets and two body parts. While at first sight such advantages may not seem substantial, nevertheless the prior art and new structures (the integral orifice assembly, alignment jig and our integral wedge assembly) are massive, rather expensive, precisely-machined metal castings, each casting about as much as either of the others, so elimination of the jig, and as well the skilled labor costs which its use requires, provides substantial savings. Inasmuch as the wedge is also functionally equal to or better than the conventional orifice, venturi, or nozzle, our integral wedge flow metering assembly represents an unusually advantageous advance in the art of flowmetering.

SUMMARY OF THE INVENTION

In the present invention, the flow to be measured passes through a bore in a single rigid body. The body has a wedge therein for flow restriction and provides support structure for the differential pressure measuring device, or other fluid pressure receiving means, which receives the differing pressures caused by the wedge.

The bore and wedge are smoothly finished (e.g., 125 microinches R.M.S.) and the latter slidably fits the former. The wedge may be welded in place, but is preferably bolted in place, so as to be removable through the bore for replacement and other purposes.

The aforesaid support structure may take the form of a flat surface of said body in which surface there are openings of passages also having openings on either side of said wedge and in the inner surface of the bore. Around the first said openings are resilient gaskets for sealing between the aforesaid flat surface and a corresponding flat surface of fluid pressure receiving means, the last said flat surface having therein openings of fluid pressure receiving passages, and the last said openings registering with said first said openings. The resilient gaskets prevent leakage from between the aforesaid flat surfaces, as well as direct contact therebetween, which could allow leakage to occur.

BRIEF DESCRIPTION OF THE DRAWINGS

FIG. 1 is an end elevation view of the body of a flow metering assembly according to the invention.

FIG. 2 is a sectional view taken on the normal plane A—A bisecting the view of FIG. 1.

FIG. 3 is a plan view of the top of said body.

DESCRIPTION OF THE PREFERRED EMBODIMENT

FIGS. 1, 2 and 3 are full-scale, i.e., the flow-metering assembly is proportioned to measure flow in a pipe-line of one inch nominal inner diameter, using a 45° wedge 1 made of type 316 stainless steel and having a vertical height of 23/32 inch. The assembly consists essentially of wedge 1 and a body 2 cut from an extruded length of type 316 stainless steel.

Machined in body 2 is the main bore 3 of uniform 1 inch diameter and having a smoothly finished inner surface 4. The wedge 1 has smoothly finished planar faces 5 and 6 and smoothly finished peripheral cylindrical surface 7. Bore 3 has the shape of a circular right cylinder of constant diameter, and wedge 1 has the shape of a segment cut from said cylinder, so to speak, whereby peripheral surface 7 has a close sliding fit with the bore's inner surface 4.

It will be observed, therefore, that the wedge 1 can slide bodily along the bore, and also can rotate on the common axis of revolution it shares with bore 3, but cannot move otherwise. In practice, this means that wedge 1 is confined to bore 3 because the inner surfaces of the sections 8 and 8' of the pipe line, in which the body 2 is inserted, will, due to normal roughness of internal finish, deviation from circularity and/or other irregularity due to the normal pipe-fabrication process, have sufficient of an interference fit with wedge 1, that despite having nominally the same inner diameter, the bores of section 8 and 8' will effectively block passage of wedge 1 into the pipe line, thereby obviating any possibility of the wedge getting loose and being propelled, piston-like, through a straight run of pipe line and into process machinery the operation of which it could interfere with, or which it might damage.

In practice, of course, it is necessary to fix the wedge in place in order to maintain it properly positioned with respect to fluid pressure transmitting passages 9 and 10 which open at bore surface 4, at either side of wedge 1 and into the bore 3. Also, the peripheral surface of the wedge has to contact the bore's surface at points at least 180° apart around the circumference of the bore. Otherwise, an unfastened wedge of lesser extent of contact would be displaceable along the pipe, as it would be able to clear the inner surface of the pipe. In this case, the peripheral surface 7 continuously contacted more than 180° of the circumference of said bore.

While various means could be used to fix the wedge 1 in place, we show bolting. Thus, bolts 11 and 13 are threaded into tapped holes 12 and 14 in wedge 1, through bores 15 and 17 somewhat loosely receiving the shanks of bolts 11 and 13, with countersunk bores 16 and 18 receiving the heads of the bolts, and there being gaskets 19 and 20 under the bolt heads for preventing fluid leakage from bore 3 via bores 15 and 17.

The passages 9 and 10 terminate at fluid pressure receiving means portion 21 of body 2 in disc-like openings 22 and 23 of substantially larger diameter than the otherwise uniformally circular, right-cylindrical bores which form passages 9 and 10.

Surrounding openings 22 and 23 are circular gaskets 24 and 25 filling corresponding annular depressions in the flat surface 26 of portion 21, and projecting a uniform distance (shown a little exaggerated for visibility's sake) above surface 26. Fluid pressure receiving means 27, (fragmentarily shown) which may be a differential pressure gauge or transmitter, or a valve manifold, or, at any rate, usually some relatively massive device, is clamped to body portion 21 by means of bolts 28 and 29, somewhat loosely-received in through holes 30 and 31 in body 21, and threaded into tapped holes 32 and 33 of substantially rigid body 34 of receiver 27 which has a flat under-surface 35 at which open a pair of passages corresponding to passages 9 and 10 (one only, passage 36, being shown), the former passages being, in effect, continuations of the latter and having the function of exposing pressure responsive means (for control or measuring purposes), forming part of or being connected to device 27, to the fluid pressures developed when fluid flows through bore 3 of body 2.

The bolts 28 and 29 (and a corresponding pair, not shown, but received somewhat loosely in through-holes 37 and 38 of body portion 21), draw the two surfaces 26 and 35 together sofar as to compress the gaskets 24 and 25 into fluid sealing engagement with the rigid metal surfaces in contact with the flat, parallel, annular, upper and lower surfaces of the two identically-dimensioned gaskets 24 and 25, without, however, the rigid metal surfaces touching each other. For best sealing results, we prefer so-called Rulon gaskets 24 and 25 of the type wherein the gasket material is a fluorine-based plastic having a ceramic particle filling. A gasket of this material, though roughly incompressible unless compressed past its yield strength, forms a stable, fluid-tight seal, exhibiting substantially no cold flow or temperature sensitivity, and being capable of reuse.

We will not here set forth the basic principles and practices involved in using the wedge flow restriction, both because we are not concerned with them here and because they are set forth in sufficient fullness in the above identified ISA Paper No. 820, to which we recommend that those perusing our present disclosure refer for further information about flow metering with a wedge flow restriction.

However, our novel flow metering assembly, because we have designed it around the wedge shape, provides for improvements in practice and construction which have not been available in prior art metering assemblies. Our assembly has but two basic parts, to wit, wedge and body, yet only the simplest means (a few bolts) provide for replacing the wedge, and for mounting a receiver to it. Inserting our assembly in or removing it from a pipe line, involves merely screwing or unscrewing the sections of pipe line next adjacent the assembly.

This is to be contrasted to the integral orifice assembly which, every time it is necessary to get at the orifice for replacement, or the like, needs to have its basic parts aligned, whereas "getting at" our wedge never results in any need for alignment of the assembly. With the integral orifice assembly, once aligned, problems still arise, because now two main parts of the assembly need to be clamped together. As each main part connects to the pipe line in which flow is to be measured, it is difficult to draw the two parts together by clamping without disturbing the tightness of the connection to the line, and/or even the alignment. One particular difficulty which can develop is that misalignment in the final assembly, may result in a metal to metal contact and, eventually, fluid leakage, developing between parts where there is supposed to be a fluid seal, especially if there are gaskets like gaskets 24 and 25, FIG. 2, hereof since alignment between the upper surfaces of such gaskets and the surface of the receiver (corresponding to surface 35 of receiver 27, FIG. 1 hereof) is critical.

With our wedge assembly, none of this can happen. To begin with, the basic geometry of the flow path in our assembly is that of a rigid, one-piece body, and so is not modifiable in any way which can adversely affect operation of the assembly. Thus, neither changing the wedge nor assembling or disassembling the fluid receiver to the body ever can effect alignment, because no matter what is done by way of connecting the pipe line to the body, the wedge to the body, or the receiver to the body, changes the geometry of the clamped parts. Hence, no seal can be disturbed by assembly, disassembly, wedge replacement, or the like.

INDUSTRIAL APPLICATION

The above-identified Paper No. 820 sets forth numerous industrial applications in which our invention would be especially useful depending on pipe size, wedge size, and various flow and compositional characteristics of the materials being metered. In addition, wedge heights may be standardized to provide four different effective openings in bore 3 and that will suffice, insofar as is now known, to cover most metering circumstances. Expressing effective opening as h/d, where h is the shortest distance along the diameter of bore 3 from the apex of wedge 1 to a point on the surface 4, and d is the diameter of bore 3 at the same point, then wedge heights providing h/d ratios of 0.2, 0.3, 0.4 and 0.5 will suffice.

We claim:

1. A flow metering assembly comprising a body having a bore therethrough, said bore having connecting means at at least one end constructed and arranged for connecting said bore to a pipe line in order to provide for flow of fluid through said bore and pipe line in series;

said bore having wedge means therein and said wedge means partially-occluding said bore for creating a flow-representative pressure drop while said flow of fluid exists, there being fluid pressure transmitting means in said body for transmitting fluid pressures representative of said presure drop to fluid pressure receiving means connected to said fluid pressure transmitting means;

said wedge means being separate from said body but fitting said bore, there being fixing means fixing said wedge means fixedly in place in said body;

said flow metering assembly including the improvement wherein said wedge means has the shape of a wedge having an outer peripheral surface extending for at least 180° of the circumference of said bore.

2. The flow metering assembly of claim 1, said fixing means being disconnectible from said wedge means for freeing said wedge means whereby to provide for removing it from said body through said bore.

3. A flow metering assembly comprising a body having a bore therethrough, said bore having connecting means at at least one end constructed and arranged for connecting said bore to a pipe line in order to provide for flow of fluid through said bore and pipe line in series:

said bore having wedge means therein an said wedge means partially-occuluding said bore for creating a flow representative pressure drop while said flow of fluid exists, there being fluid pressure transmitting means in said body for transmitting fluid pressures representative of said pressure drop to fluid pressure receiving means connected to said fluid pressure transmitting means;

said wedge means being separate from said body but fitting said bore, there being fixing means fixing said wedge means fixedly in place in said body, said body consisting essentially of a single rigid piece of material, and a portion of said body being support means for sealedly coupling said fluid pressure receiving means thereto in fluid pressure receiving relation to said fluid pressure transmitting means;

said flow metering assembly including the improvement wherein said support means includes resilient gasket means and means clamping fluid pressure receiving means to said body via said gasket means, for sealingly and non-rigidly supporting said fluid pressure receiving means on but out of direct contact with said body and in fluid pressure receiving relation to said fluid pressure transmitting means.

4. The flow metering assembly of claim 3, wherein said fluid pressure transmitting means includes a pair of passages each opening into said bore, one on each side of said wedge means, and each of said pair also opening at spaced locations on the external surface of said portion of said body; and wherein said fluid pressure receiving means has corresponding fluid pressure receiving passages of said fluid pressure receiving means;

there being resilient gasket means surrounding each location of one said pair of locations and sealing around the respective openings of said pairs of passages, and spacing said fluid receiving means from said body for preventing a rigid connection from existing between said body and said fluid receiving means.

5. The flow metering assembly of claims 1, or 2, wherein the internal surface of said bore is substantially exactly right-cylindrical and smoothly finished, and said wedge has the shape of a right-cylindrical segment, and its said outer peripheral surface is like said internal surface and substantially coincident therewith; whereby to keep said wedge means from being able to slide out of said bore and into a right cylindrical conduit having the same internal diameter as said bore but greater internal roughness, even when said fixing means is disconnected from said wedge means.

* * * * *